United States Patent
Duro

(10) Patent No.: US 12,526,278 B2
(45) Date of Patent: Jan. 13, 2026

(54) AUTHENTICATION METHOD, CORRESPONDING DEVICE AND PROGRAM

(71) Applicant: Orange, Issy-les-Moulineaux (FR)

(72) Inventor: Jean-Marc Duro, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 222 days.

(21) Appl. No.: 17/842,214

(22) Filed: Jun. 16, 2022

(65) Prior Publication Data

US 2022/0407854 A1 Dec. 22, 2022

(30) Foreign Application Priority Data

Jun. 16, 2021 (FR) ..................... 2106355

(51) Int. Cl.
*H04L 9/40* (2022.01)

(52) U.S. Cl.
CPC ........ *H04L 63/0876* (2013.01); *H04L 63/108* (2013.01)

(58) Field of Classification Search
CPC . H04L 63/0876; H04L 63/108; H04L 9/3271; H04L 63/0838; H04L 63/0853; G06F 2221/2103; G06F 21/34
See application file for complete search history.

(56) References Cited

U.S. PATENT DOCUMENTS

| | | | |
|---|---|---|---|
| 2009/0319776 A1* | 12/2009 | Burch | ................... H04L 63/08 713/168 |
| 2010/0293382 A1 | 11/2010 | Hammad | |
| 2012/0031969 A1 | 2/2012 | Hammad | |
| 2021/0110027 A1 | 4/2021 | Stohr et al. | |

OTHER PUBLICATIONS

"Jia-Lun Tsai, Nai-Wei Lo, and Tzong-Chen Wu" ; "Novel Anonymous Authentication Scheme Using Smart Cards"; "Nov. 2013" ; IEEE Transactions On Industrial Informatics, vol. 9, No. 4, (Year: 2013).*
French Search Report for French Application FR 2106355, dated Feb. 24, 2022.

* cited by examiner

*Primary Examiner* — Mohammed Waliullah
(74) *Attorney, Agent, or Firm* — Knobbe, Martens, Olson & Bear, LLP

(57) ABSTRACT

A method for authenticating access via a communication terminal, before a server is disclosed. The method includes, subsequently to the transmission by an access application of the communication terminal, to the server, of a connection request: transforming a variable element, received from the server, using transformation materials obtained upon a subscription before the server, outputting a transformed element; transmitting to the server, an identifier associated to the access and to the transformed element; and receiving an authentication of the access, originating from the server taking the transformed element into account.

20 Claims, 3 Drawing Sheets

AUTHENTICATION METHOD, CORRESPONDING DEVICE AND PROGRAM

CROSS-REFERENCE TO RELATED APPLICATIONS

This application claims foreign priority to French Patent Application No. FR 2106355, entitled "AUTHENTICATION METHOD, CORRESPONDING DEVICE AND PROGRAM" and filed Jun. 16, 2021, the content of which is incorporated by reference herein in its entirety.

BACKGROUND

Field

The disclosure relates to access authentication to communication devices. More particularly, the disclosure relates to a method for authenticating a user or an application before a remote server.

Description of the Related Technology

Digitisation of daily life has generated a constraint to secure accesses to services provided online via servers to which the users connect using communication terminals. The so-called one-factor conventional authentication method, by entering identifiers/passwords pairs ha reached its end, primarily because of the unawareness of the users who use passwords that are not secure enough and/or who use identical passwords for different services (resulting in a non-security of their personal data). The discoveries of hundreds of hacked accounts on various service providers prove the significance of the encountered problems. To overcome the problems posed by one-factor authentication, as mentioned before, two-factors authentication methods have been built.

For a long time, the two-factor authentication has been considered to be the proper response to the problems of account hacking encountered by users and service providers. This two-factor authentication actually consists in using two different mechanisms to authenticate a connection to a service from a communication terminal. For example, a two-factor authentication may be implemented on the one hand by performing a first input of a data pair of the (identifier, password) type (first factor) and then by performing a second input, in a dedicated form field of a connection page that is subsequently displayed, of a confirmation code received by another communication mechanism. Basically, such a confirmation code is transmitted by email or by SMS (standing for "short message service"). However, both these methods have drawbacks.

The transmission of a confirmation code by email is increasingly contested as being less secure: all it needs is a malware installed on the communication terminal of the user for this code to be intercepted and enable the hacker to use it, on a device other than that of the legitimate user to connect to the secure services. Even more simply, all it needs is that the identifier/password pair used for the email account to be identical to that one used to access the requested service, for the hacker to be instantaneously capable of recovering the transmitted confirmation code.

Although this is theoretically more secure, the transmission of a confirmation code by SMS also includes drawbacks, one of which being the need to have two separate devices to perform the authentication. For example, in the case where it is desired to connect to a service from a laptop, it is necessary to have a smartphone to know the code transmitted by SMS. In the case where one connects to the service with his smartphone (i.e. only one device is available for both authentication factors), security with a confirmation code transmitted by SMS becomes even more problematic as that with a conformation code transmitted by email: all it needs is that a malware is installed on the smartphone for it to know the transmitted confirmation code.

In addition, the European Banking Authority has put an end to the use of confirmation SMS for online payments, making the implementation of more secure alternative solutions necessary. To enhance security, the European authorities wish to replace this mechanism with a more reliable, but more complex, process. Thus, the SMS may be replaced, depending on the actors, by the input of a confidential code on the banking application installed on the communication terminal, by a digital fingerprint or else by face recognition. However, this causes a forced-march adaptation, for the involved actors, including banks and e-commerce websites, but also for the users, who must have equipment that is recent enough and/or having enough memory and/or processing capabilities.

Hence, there is a need for a solution allowing improving the security of users' authentication.

SUMMARY

The technique object of the present disclosure has been built while keeping these problems of the prior art in mind. More particularly, an authentication technique is suggested which is based on the implementation of a password, of a variable password, for example varying between two successive connections, for example intended for one use. More particularly, a method is suggested wherein a new connection to a service requires the use of a new password, which new password is unknown to the user, but is generated independently of the latter.

Thus, the suggested solution differs from the prior methods which amount to the knowledge or possession, by the user, of several different authentication factors (multi-factor authentication). Indeed, although the security conferred by these prior methods is theoretically increased, this is not always the case in practice, in particular when they are based on the knowledge of complementary information provided by the user, such as badly selected passwords.

More particularly, a method is provided for authenticating access via a communication terminal, before a server. Such a method comprises, subsequently to the transmission by an access application of the communication terminal, to the server, of a connection request:
  a step of transforming a variable element, received from the server, using transformation materials obtained upon a subscription before the server, outputting a transformed element;
  a step of transmitting to the server, an identifier associated to said access and to the transformed element; and
  a step of receiving an authentication of said access, originating from the server taking said transformed element into account.

Thus, it is possible to guarantee a secure authentication, without a person or a user having to use a password for authentication.

According to a particular feature, the authentication originating from the server occurs when the transmission, to the server, of the identifier and of the transformed element, is performed before a first period of time.

Thus, it is possible to limit, and even suppress, attempts to retry by fraudsters.

According to a particular feature, the method comprises:
a reception of a reply http, originating from the server, via a secure link, comprising a form comprising a field for entering the user identifier and a hidden field comprising the variable element;
a display of the form on a screen of the communication terminal;
an extraction of the variable element and a transmission of the variable element to a transformation module.

Thus, it is possible to split the obtainment of the data necessary for authentication in two distinct routes.

According to a particular feature, the step of transforming the variable element comprises:
The determination, by the transformation module, of transformation materials to be applied on the variable element;
The implementation of the transformation materials on the variable element, outputting the transformed element.

Thus, the transformation of the variable element is not always carried out with the same materials, which enhances safety of the authentication.

According to a particular feature, the determination of transformation materials to be applied on the variable element comprises a step of searching an encryption key within a database.

According to a particular feature, the implementation of the transformation materials on the variable element comprises a step of encrypting the random element using the encryption key.

According to a particular feature, the step of transforming the variable element is implemented by a transformation module executed on the communication terminal, independently of the access application.

According to another aspect, the disclosure also relates to an electronic device for authenticating access, before a server, said device comprising a module for transmitting, by an access application of the device, a connection request to the server, and:
A module for transforming a variable element, received from the server, using transformation materials obtained upon a subscription before the server, outputting a transformed element;
A module for transmitting to the server, an identifier associated to said access and to the transformed element; and
A module for receiving an authentication of said access, originating from the server taking said transformed element into account.

For example, such a device may be in the form of a communication terminal. Such a device may also be in the form of a secure device embedded within a communication terminal.

According to a particular feature, the module for receiving an authentication of said access are implemented when the transmission of the identifier and of the transformed element, by the authentication electronic device, to the server, is performed before a first period of time.

According to a particular feature, the access authentication electronic device comprises:
A module for receiving a reply http, originating from the server, via a secure link, comprising a form comprising a field for entering the user identifier and a hidden field comprising the variable element;
A module for displaying the form on a screen of the communication terminal;
A module for extracting the variable element and transmitting the variable element to a transformation module.

According to a particular feature, the module for transforming the variable element comprise:
A module for determining, by the transformation module, transformation materials to be applied on the variable element;
A module for implementing the transformation materials on the variable element, outputting the transformed element.

According to a particular feature, the module for determining transformation materials to be applied on the variable element comprise the implementation of a module for searching an encryption key within a database.

According to a particular feature, the module for implementing the transformation materials on the variable element comprise the implementation of a module for encrypting the random element using the encryption key.

According to some implementations, the different steps of the methods of the disclosure are implemented by one or several software or computer programs, comprising software instructions intended to be executed by a data processor of a communication terminal or of a server according to the present development and being designed so as to control the execution of the different steps of the processes, implemented independently or jointly. Consequently, the development also relates to a program, which could be executed by a computer or by a data processor, this program including instructions for controlling the execution of the steps of a method as mentioned hereinabove.

This program may use any programming language, and be in the form of source code, object code, or an intermediary code between a source code and an object code, such as in a partially-compiled form, or in any other desired form.

The development also relates to an information medium readable by a data processor, and including instructions of a program as mentioned hereinabove.

The information medium may be any entity or device that is capable of storing the program. For example, the medium may include a storage means, such as a ROM, for example a CD ROM or a ROM of a microelectronic circuit, or else a magnetic recording means, for example a hard disk or else a mobile medium (memory card).

Besides, the information medium may be transmissible medium such as an electric or optical signal, which may be conveyed via an electrical or optical cable, by radiofrequency or by other means. In particular, the program according to the present development may be downloaded on an Internet-type network.

Alternatively, the information medium may be an integrated circuit into which a program is embedded, the circuit being adapted to execute or to be used in the execution of one or more of the described processes.

According to one embodiment, the technique is implemented by means of software and/or hardware components. In this respect, the term module may correspond, in this document, to a software component, as well as to a hardware component or to a set of hardware and software components. Module may be an FPGA electronic circuit, directly integrated in an electronic device.

A software component corresponds to one or several computer program(s), one or several subprogram(s) of a program, or more generally to any element of a program or of a software adapted to implement a function or a set of functions, according to what is described hereinbelow for the considered module. Such a software component is executed by a data processor of a physical entity (terminal, server, gateway, set-top-box, router, etc.) and could access hardware resources of this physical entity (memories, record media, communication buses, input/output electronic boards, user interfaces, etc.).

Similarly, a hardware component corresponds to any element of a hardware set adapted to implement a function or a set of functions, according to what is described hereinbelow for the considered module. It may consist of a programmable hardware component or with an integrated processor for software execution, for example an integrated circuit, a chip card, a memory card, an electronic board for the execution of a firmware, etc.

Of course, each component of the previously-described system implements its own software modules.

The different embodiments mentioned hereinabove could be combined together for the implementation of the development.

BRIEF DESCRIPTION OF THE DRAWINGS

Other features and advantages of the development will appear more clearly upon reading the following description of a preferred embodiment, provided merely as an illustrative and non-limiting example, and from the appended drawings, wherein.

DETAILED DESCRIPTION OF CERTAIN ILLUSTRATIVE EMBODIMENTS

Basics Reminders

Figure 1:
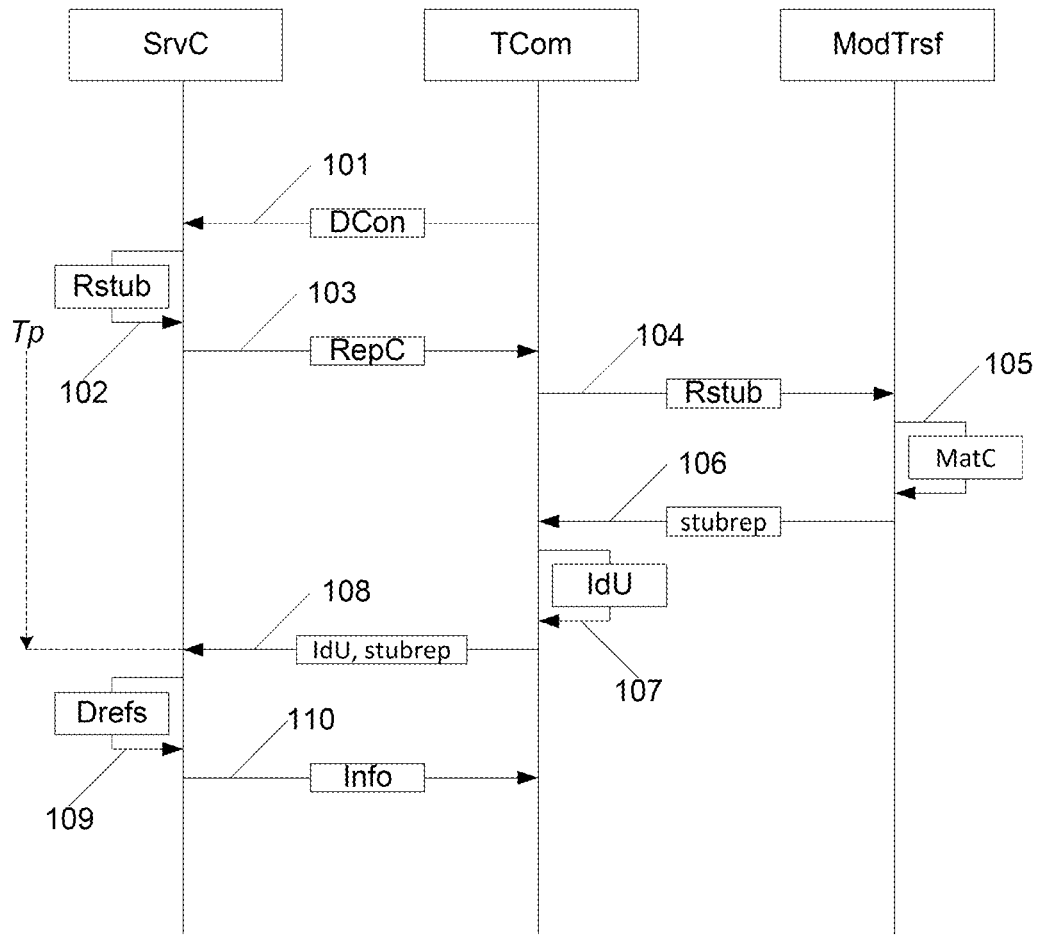
FIG. 1 describes the overall principle of an authentication method of the disclosure according to at least one embodiment.

As explained before, the overall principle of the methods object of the disclosure comprises a definition of a variable password, for example varying between two successive connections, to connect to a service before which a user or a device is subscribed. For example, it may consist of a one-use password. The password being intended for only one connection of the used communication terminal, the interception of this password by a malware or by a fraudster has no consequence, because this password becomes, for example, unusable after a given period of time, this period of time being relatively short, and may be limited to one single connection of the communication terminal of the user. This variable password may be generated by two different entities: a server (to which the user tries to connect via his communication terminal) and a transformation module, to which the communication terminal of the user has access. Thus, in some embodiments, the server generates a variable element, for example in random or pseudo-random manner, transmits this variable element to the communication terminal when the latter tires to connect, which communication terminals transfers this variable element to a transformation module which transforms this variable element into a transformed element. The transformation module returns back the transformed element to the communication terminal which inserts it in the data provided to the server to validate the connection to the service. Other data may also be provided to the server to validate the connection, and in particular an identifier (for example a user identifier), obtained by the communication terminal or input by a user wishing to access the service. When the data provided to the user by the communication terminal match with the expected ones (i.e. the identifier and the transformed element), then the connection is validated.

Thanks to this technique, the conventional "identifier/password" data pair is replaced with an "identifier/variable password (the transformed element)" pair, the variable password, which is intended for example for one use (or the likelihood of reuse thereof may be very low), being unknown to the user. The knowledge of the variable password is based on two separate entities (the server and the transformation module). For example, in some embodiments, on the server side, the generation and the emission of the variable element transmitted to the communication terminal may trigger a time counter: a reference time is for example obtained by the server and a maximum wait time is scheduled. If the reply originating from the communication terminal is transmitted to the server after this maximum wait time, then the server will not accept this reply of the communication terminal, and that being so irrespective of the content of this reply: For example, the reply originating from the communication terminal may even not be examined by the server. In addition, the generation, by the server, of the variable element may be random or pseudo-random thereby promoting the unicity of use of the variable password obtained by the transformation module. In other words, the generation of the variable element may depend on intrinsic parameters of the server, such as a time marker.

In the foregoing and in the what follows, it should be understood that the steps of transmitting data, from a first entity towards a second entity, form, for this second entity, reception steps and vice-versa, so that it is not necessary to describe all of these steps for these to be understood.

FIG. 1 shows the different steps of the authentication method according to some embodiments of the present technique.

The communication terminal (Tcom) transmits (101) a connection request (DCon) to a server (SrvC) before which the user of the communication terminal is recorded.

The server prepares (102) a variable element (Rstub) and starts, for example, a time counter (Tp), and transmits (103) the reply (RepC) to the connection request, this reply comprising the generated variable element. The implemented time counter may be optional.

The communication terminal receives the variable element in the reply of the server, identifies it as such and transmits it (104) to the transformation module (ModTrsf).

The transformation module (ModTrsf) receives the variable element, transforms it (105) with transformation materials (MatC) at its disposal and transmits (106) the resulting value (stubrep) to the communication terminal.

Subsequently to or concomitantly with the transmission of the variable element to the transformation module, the communication terminal obtains (107) (from a user interface or from a storage module) an identifier (for example a user identifier) (IdU) expected by the server. Once the transformed element is received from the transformation module, the communication terminal generates a reply comprising the identifier and the transformed element and transmits it (108) to the server.

The server obtains the reply originating from the communication terminal and, for example whether this reply is received on time (before the end of the time count Tp) and compares (109) these received data with expected data (reference data Drefs). In the case where the data correspond to the reference data, access to the service may be validated. For example, the server may inform (110) the communication terminal (info). All these steps may be implemented by the communication terminal itself (notwithstanding the use of other modules coupled for example to the terminal) or else by an access application (such as a web browser, a specialised application) executed on the communication terminal. The identifier may be a user identifier or else an identifier specific to the terminal itself, independent of the user of the terminal).

Thus, in some embodiments, the authentication may be based on only one known piece of data: an identifier for access to the service. It is possible that the other data used for authentication (in particular the variable password) do not require prior knowledge (of the user and consequently of a fraudster having this identifier). Thus, in at least some embodiments, it is possible to limit the memorisation burden on a user while reducing the risks of loss, omission and/or definition of a password that is not secure enough. Depending on the embodiments, as explained later on, the transformation module may be embedded to (or executed on) the communication terminal of the user or be a remote transformation module, accessible via a communication network.

According to some embodiments of the present technique, the transformation module may comprise a module for determining a transformation to be applied on a variable element (for example random or pseudo-random) that it receives from the server (this transmission being supported by the communication terminal). Several embodiments of this transformation may be considered. Some of these examples are described later on and the different features of these examples could of course be combined together, and so are the features of the authentication method, some embodiments of which are suggested later on.

In some embodiments, the transformation module may therefore comprise a module for determining at least one transformation to be applied on one element, such as a variable element, that it receives from the server. These means may be implemented according to knowledge acquired beforehand of the transformation materials to be used (i.e. at least one transformation function to be applied (if several transformation functions could be used) and/or of parameters of transformation function(s). According to the present technique, these transformation materials may be acquired by different means. Next, the acquisition of transformation materials upon subscription of the user to the service supplied by the server is described. Yet, it could be considered that this acquisition of transformation materials is performed by other means, in particular through the provision, by the operator of the service, of a specifically dedicated module, for example to be connected to the communication terminal of the user, on a USB port for example.

In particular, these transformation materials may be supplied to the transformation module upon the initial subscription of the user to the service. This acquisition is described in a simplified manner (i.e. all processed data are not detailed) with reference to FIG. 2.

Figure 2:
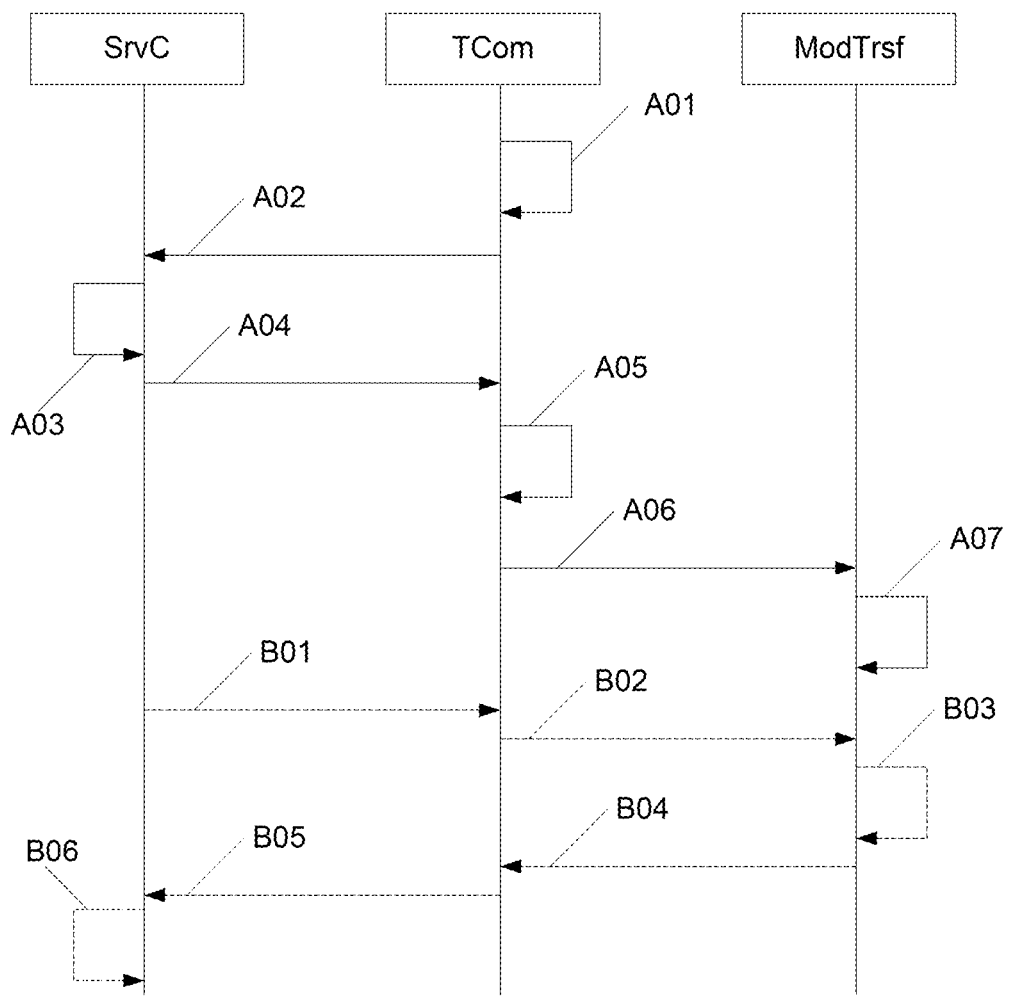
FIG. 2 describes a subscription before the server according to at least one embodiment.

Thus, FIG. 2 shows the different steps of the subscription method according to some embodiments of the present technique.

In the illustrated embodiment, the acquisition may comprise an execution (A01), on the communication terminal, of an application enabling the subscription of the user before the server (i.e. for the future implementation of one or several service(s) to which the user wishes to access). For example, this subscription application (or this subscription module, depending on the selected form) performs at least some of the following operations: display of a subscription human-machine interface comprising an area for inputting an identifier (for example a user identifier) and a password. According to the embodiments of the present disclosure, the subscription application may be implemented by the transformation module and/or the subscription module and the transformation module may form one same module, for example installed within the communication terminal of the user. Next, a separation of these modules/functions is described.

In the illustrated embodiment, the user performs the requested input (for example the selection of an identifier and of a password) and validates the subscription human-machine interface, which causes the transmission (A02) of the input data, by the subscription application, to the server.

The server checks up (A03) the received data and if these data are approved, transmits (A04), in return, to the subscription application, the transformation materials (the transformation to be performed and/or the parameters of this transformation). This step of transmitting the transformation materials, by the server, may comprise several exchanges with the subscription application and some of these exchanges are described later on.

The subscription application may check-up (A05) the received transformation materials (for example, the check-up may consist of a CRC verification). In some embodiments, the check-up may be optional. It transmits (A06) these received transformation materials to the transformation module, which records them (A07), for example in a secure memory area and/or in a protected file of the operating system of the device on which it is executed.

As explained, the step of transmitting the transformation materials, by the server, may comprise:
the provision, besides the identifier/password pair, of one or several code(s) based on a personal piece of information and/or an encryption method that the subscription application wishes to subscribed before the service provider; this or these provided code(s) may be derived from biometric data, an image, a text or any data source of the communication device of the user for example;
the processing, by the server, of all data received from the subscription application, said processing may output, on the one hand identification data of a transformation method to be applied, amongst the transformation methods suggested by the subscription application (if the latter has suggested several possible methods for example) and on the other hand at least one transformation parameter to be applied, said parameter being for example derived, by the server, from the code(s) provided by the subscription application.

Other concomitant or subsequent steps may also be implemented, like:
the transformation (B01), by the server, of a variable verification element to the subscription application, which transmits (B02) this variable verification element to the transformation module, which, based on the transformation materials (received for example beforehand), may transform (B03) this variable verification element into the transformed verification element and transmits (B04) the latter again to the subscription application, which forwards it (B05) to the server for verification (B06) (according to the same process as described before); and the implementation of the reverse process (not illustrated) i.e. transmission, by the subscription application, of a variable verification element to the server, which, based on the transformation materials it has generated, transforms this variable verification element into the transformed verification element and transmits the latter again to the subscription application, which forwards it to the transformation module for verification.

This allows ensuring that the used materials comply with the expectations and that they are symmetrically detained and recorded by the recipient entities (namely the server—or a specific and secure module of the server) and the transformation module.

DESCRIPTION OF SOME EMBODIMENTS

In this embodiment, the used transformation materials are encryption keys, and it is considered that the transformation module on the one hand and the server on the other hand implement one same transformation method, namely the use, in a first encryption function, of the encryption key symmetrical detained by both of them on the variable element transmitted by the server. This embodiment does not limit the scope in any manner whatsoever: it could be considered that the transformation material is not symmetrical but consists of pairs of private and public keys. It could also be considered that this transformation material is in the form of one or several associative array(s) to be used in an AES-type process for example. It could also be considered that the transformation materials are in the form of cryptographic primitives or functions and of instructions (or parameters) for sequencing the execution of these cryptographic primitives or functions. Moreover, the encryption method used by the transformation module may be negotiated, between the communication terminal (i.e. between the subscription module of the communication terminal) and the server upon subscription of the user), such as BlowFish 256 bits. The used encryption keys may be determined only by the communication terminal itself (i.e. the subscription module of the communication terminal and/or the transformation module) or be the object of a negotiation between the server and the communication terminal upon subscription.

Figure 3:
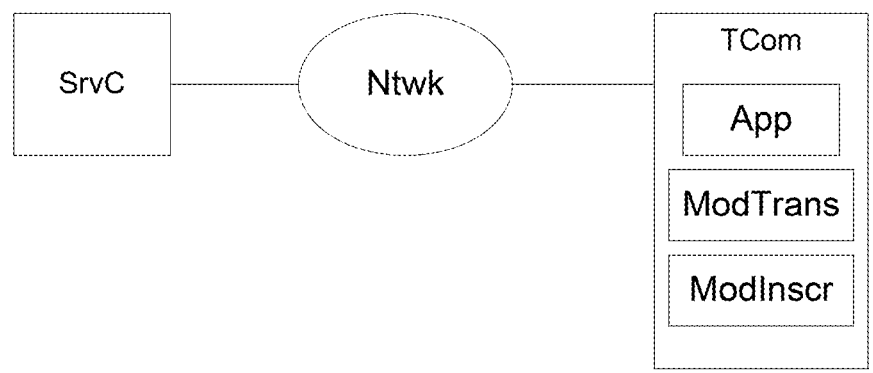
FIG. 3 illustrates a system for implementing the described technique according to at least one embodiment.

Referring to FIG. 3, the system in which this embodiment is implemented is described. Such a system comprises a server SrvC (or a set of servers) belonging to a service provider and connected to a communication network Ntwk, which is also connected, either directly, or indirectly, to a communication terminal TCom of a user. Moreover, the terminal of the user comprises an access application App to execute the authentication, a transformation module ModTrans, and a subscription module ModInsc (these two modules may form only one same module). For example, these transformation and subscription modules are installed within a secure memory space of the communication terminal. Next, situations where these two modules are not installed within the communication terminal are also described.

The authentication of a user, as indicated before, is implemented from an access application installed on the communication terminal of the user. This access application may be in the form of a browser (such as Firefox™, Chrome™, etc.) or else a specialised application (for example an application for accessing a social network, a trade application, a payment application, etc.), these applications having functions for connection to a remote server (i.e. a server implementing a service). Before being able to connect to the user, it is necessary to log in and it is this authentication procedure that is described in detail hereinbelow:

In the described example, the access application connects to a server adapted to implement the previously-described authentication method, in one of its embodiments, by mobilising the necessary connection resources (a web page for example);

The server transmits to the access application a reply comprising on the one hand an input field allowing entering an identifier and on the other hand an element (selected for example in a variable manner), in a hidden reply field (this means that this hidden reply field is not displayed by the access application); other fields may optionally be transmitted (in the clear or hidden) in the reply of the server; once the reply is transmitted, the server starts a time counter;

Upon reception of this reply from the server, the access application displays the connection page and/or recovers the requested identifier (namely it displays the page transmitted by the server in the reply, for example in the case of a connection to a web server with a connection page; and/or it processes the obtainment of this identifier based on the data it has, for example when the identifier is pre-recorded by the access application, as is the case of the applications installed on smartphone or tablet type communication terminals); the access application may also obtain the element transmitted by the server and transmit it to the transformation module, by building a request for obtaining the encrypted element to the transformation module; the provision of the element, transmitted by the server, to the transformation module may be accompanied with the provision of one or several identifier(s) when these data are made necessary to identify the key to be used within the transformation module;

Upon reception of the element and of the possible identifier(s), via the access application, the transformation module obtains the associated key and encrypts the received (variable) element using this key; it then transmits this encrypted element (i.e. the transformed element, stubrep) to the access application, in response to the request transmitted by the latter; The obtainment of the encryption key by the transformation module consists, for example, in extracting, from a database, managed by the transformation module, the key corresponding to this or these identifier(s); another example of obtainment may consist in requesting this key before a security module, which keeps these keys in a specific memory area and which may be connected or inserted into the communication terminal;

Upon reception of the reply originating from the transformation module, which reply comprises the encrypted element, the access application inserts this reply, in the form of a hidden reply field, in the data that should be transmitted to the server; Once the user (and or the access application) has entered his identifier and validated the transmission of the data (for example by clicking on a validation button), the access application transmits these data to the server comprising the encrypted element in a field that is dedicated thereto or not;

Upon reception of the reply originating from the access application, the server extracts the identifier of the client and processes the encrypted element: in general, the encrypted element received from the access application is compared with a reference encrypted element detained by the server (or provided to the latter) and in the case where these two encrypted elements are identical, the server considers that the authentication was successful and provides access to the service;

In the case where the reply originating from the access application has been received too late (after a period of time defined by the time counter) or else the two encrypted elements do not match, the server communicates to the access application a new authentication form comprising a new element to be encrypted (for example a variable element) for the access application to be able to try connection again.

Upon completion of the implementation of the previously-described method, the communication terminal is properly identified before the server. It should be noted that, in this embodiment, the authentication of the communication terminal (or of the access application of the communication terminal) has been carried out without the user having to provide a password to be able to log in. It may also be considered, in another embodiment, to implement this method while completing it with the input or the provision of a password which is recorded by the server: although optional, such a complementary input may allow increasing the security of access to the service.

The check-up of the encrypted element (transformed element) by the server may be implemented in several different ways. As indicated before, upon reception of the data originating from the access application, the server is provided on the one hand with the encrypted element, originating from the access application and on the other hand with the element it has transmitted to the access application upon initialisation of the process. Two specific cases could be considered to enable the verification of the encrypted element transmitted by the access application, these two specific cases being segregated depending on the detention, or not, by the server, of the key associated to the identifier received from the access application.

In the case where the server has its own key database, then the server is capable of computing its own reference encrypted element (i.e. its reference variable password). For this purpose, it may obtain the identifier transmitted by the access application and search the key corresponding to this identifier within its key database. Once this key is obtained, it may encrypt the variable element with the latter and obtains its reference encrypted element which it may then compare to the encrypted element (i.e. the variable password) received from the access application.

In the case where the server does not have its own key database, it must resort to an external resolution service. Two solutions could be considered: in the case where the external resolution service is a trust service, to which the server could access in a secure manner: the way for obtaining the reference encrypted element is then substantially identical to that one described in the local case.

In the case where the external resolution service is not directly connected to the server, another process is implemented, based in particular on the check-up of the authorisation of the server to request the obtainment of a reference encrypted element.

In this embodiment, the subscription of the user within the server is carried out from a subscription module, operating on the communication terminal of the user.

The subscription process may comprise the following implementation of previously-described steps like:

Opening, by the subscription module, of a subscription interface comprising at least one request for entering an identifier and a password, which form the subscription elements; depending on the operational implementation conditions, the subscription interface may comprise other fields enabling the input of other information, including the input of a URL before which the subscription module of the communication terminal must or could connect to perform the subscription;

Once the user has completed the entry of the data required for subscription and has performed the validation of this entry before the subscription interface (for example by clicking or by selecting "validate" button), the entered data relating in particular to the subscription elements are transmitted, in a secure manner, to the server; The security of the transmission of these data is achieved for example through the use of a HTTPS request/reply exchange transmitted to the subscription server;

Upon reception of this request comprising at least the aforementioned subscription elements (i.e. the data entered by the user), these elements are processed by the server to perform the subscription of the user and saving of the transmitted elements, before the server; this subscription and saving phase may end with the transmission, to the subscription module, of an encryption key, via a HTTPS reply for example. Optionally, in case of error during the subscription of the user by the server, one or several error message(s) may be transmitted to the subscription module instead of the encryption key;

Once the encryption key is received, the subscription module establishes a connection with the transformation module. Depending on the operational implementation conditions, this transformation module may be installed within the communication terminal, or installed within a remote service. In both of these implementations, the subscription module may provide the transformation module with the encryption key received from the server; this provision may be accompanied with the provision of an identifier. As explained before, the transformation module acts like a service (for example like a service http) and is capable of receiving requests for inserting and/or updating keys originating from the subscription module and of outputting data encrypted using keys to access applications or programs that properly ask for it.

As explained before, two different specific cases could be considered for the transformation module: local installation on the communication terminal or remote installation.

In a first embodiment, the transformation module is implemented locally: the transformation module is installed within the communication terminal of the user. This implementation has the advantage of limiting the risks of disclosure of the encryption keys (i.e. transformation materials). These may be recorded within the communication terminal of the user, for example in a secure storage environment or in a secure element, when this is possible. The subscription module locally performs a call of the transformation module to provide the necessary data for the subscription of this key (for example the user name to which this key is associated and/or the service (i.e. a URL or a URL portion) to which this key is associated. It should be noted that these data may also be transmitted in case of remote implementation of the transformation module. Optionally, the transformation module may also record the password entered for subscription before the service, and received from the subscription module. In this embodiment, access to the transformation module may also be implemented via an API ("Application Programming Interface") which comprises a function for access to the subscription module on the one hand (for example an access function specifically dedicated to this module) and an access function specifically dedicated to one or several authorised access application(s) (for example one or several Web browser(s) and/or one or several specialised application(s) installed on the communication terminal, these accesses being for example managed using a whitelist defined and recorded within the transformation module).

In a second embodiment, the transformation module is remotely implemented: the transformation module is not installed within the communication terminal of the user. This implementation has the advantage, for the user, of not requiring any update of the transformation module, which is therefore centralised. Since the transformation module has several keys at its disposal, it might be necessary to provide one or several complementary identifier(s) (and/or login(s) password(s)), in addition to the encryption key, at the time of subscription of this encryption key within the transformation module.

Several possibilities could be considered and/or preferred for locating the transformation module, when the latter is remote from the communication terminal of the user.

In a first variant, the transformation module may be installed within a local server of the communication network before which the communication terminal is connected. In this case, the transformation module is installed, for example, within an internet access gateway, provided by an internet service provider before which the user is subscribed, this access gateway (also called "Set Top Box" or else "Box") is installed with the user by the internet service provider and embeds the aforementioned transformation module.

In some embodiments, such an implementation may offer advantages for the user. Indeed, it is frequent that a user has many communication terminals (computers, tablets, game consoles, telephones) within his home and the use of these communication terminals is shared. Thus, the services implemented on these communication terminals do not exclude each other: it is frequent for the user to implement the same service requiring a secure connection both on a laptop computer and on a smartphone, for example. Such an implementation may secure even further access to these encryption keys (transformation materials): by managing these encryption keys within the local network, it may be simpler to ensure security thereof, for example by ensuring that only inner requests originating from the local network of the user could obtain the encryption of a piece of information, while external requests (i.e. originating from devices located outside the local communication network of the user) cannot obtain the encryption of a piece of information.

In a second embodiment, the transformation module is installed within a remote server (i.e. Cloud service). This implementation may enable the user to access the aforementioned services without necessarily being connected to his local network and, furthermore, without the need for installing his transformation module within his communication terminal. In addition, a remote implementation of the transformation module may possibly contribute in obtaining a security level of this manager meeting the relating rules of the art and may therefore be more secure than a local implementation. Moreover, in this specific case, it is necessary that one or several identification data be provided to the transformation module upon recording of the encryption key, in order to enable the transformation module to output a right encrypted piece of information to the communication terminal that asks for it.

Other Features and Advantages

According to one embodiment, the techniques described in the present document are implemented by one or several specialised computer device(s). The specialised computer devices may be wired so as to execute the techniques, or may include digital electronic devices such as one or several application-specific integrated circuit(s) (ASIC) or field-programmable gate array (FPGA) programmable by the user which are permanently programmed to execute the techniques, or may include one or several multipurpose hardware processor(s) programmed to execute the techniques in accordance with the instructions of the program in the firmware, the memory, another storage, or a combination. These specialised computer devices may also combine a customised hard-wired logic, ASICs or FPGAs with a customised programming to carry out the techniques. The specialised computer devices may be stationary computer systems, mobile computer systems, pocket devices, network devices or any other device that embeds a hard-wired logic and/or programmed to implement the techniques.

Figure 4:
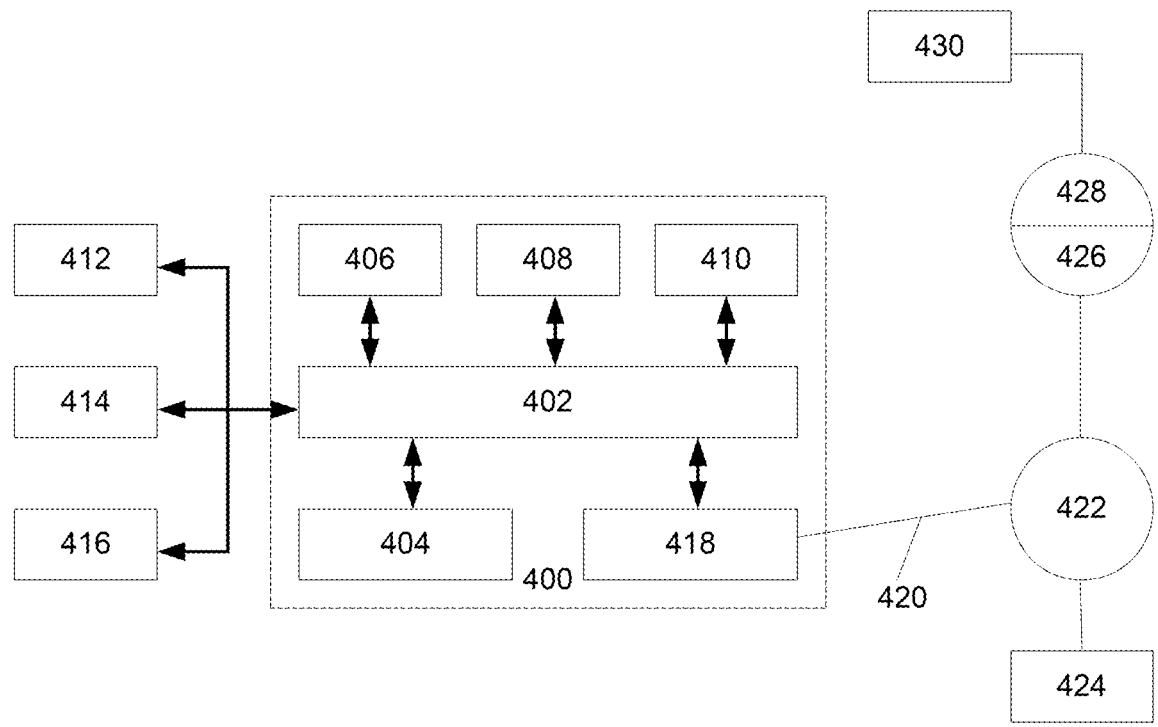
FIG. 4 illustrates a device for implementing the described technique according to at least one embodiment.

For example, FIG. 4 is a block diagram which illustrates a computer system 400. The computer system 400 comprises a bus 402 or another communication mechanism to communicate pixel data, metadata and other data, and a hardware processor 404 coupled to the bus 402 to process the pixel data and the metadata and other data. For example, the hardware processor 404 may be a general-purpose microprocessor. The computer system 400 also comprises a main memory 406, such as a random-area memory (RAM) or another dynamic storage device, coupled to the bus 402 to store the pixel data and the metadata and other data and instructions to be executed by the processor 404. The main memory 406 may also be used to store temporary variables or other intermediate information during the execution of the instructions to be executed by the processor 404. When they are stored in a non-transitory storage medium accessible to the processor 404, these instructions transform the computer system 400 into a special-purpose machine which is customised to perform the operations specified in the instructions. The computer system 400 further comprises a read-only memory (ROM) 408 or another static storage device coupled to the bus 402 to store information or static instructions for the processor 404. A storage device 410, such as a magnetic disk or an optical disk, is provided and coupled to the bus 402 to store information and instructions. The computer system 400 may be coupled via the bus 402 to a screen 412, to display information to a user of the computer. An input device 414, comprising alphanumeric keys and others, is coupled to the bus 402 to communicate information and command selections to the processor 404. Another type of user input device is a cursor control 416, such as a mouse, a trackball or cursor direction keys to communicate direction information and command selections to the processor 404 and to control the movement of the cursor on the display 412.

The computer system 400 may implement the techniques described in the present document using a customised hard-wired logic, one or several ASIC(s) or FPGA(s), a firmware and/or a program logic which, in combination with the computer system, tunes or programs the computer system 400 so that it is a special-purpose machine. According to one embodiment, the techniques of the present document are executed by the computer system 400 in response to the processor 404 executing one or several sequence(s) of one or several instruction(s) contained in the main memory 406. These instructions may be read in the main memory 406 from another storage medium, such as the storage device 410. The execution of the instruction sequences contained in the main memory 406 makes the processor 404 execute the steps of the process described in the present document. In other embodiments, hard-wired circuits may be used instead of or in combination with software instructions. The term "storage medium" as used herein refers to any non-transitory medium that stores data and/or instructions that make a machine function in a specific manner. These storage media may comprise non-volatile media and/or volatile media. For example, the non-volatile media comprise optical or magnetic disks or memory components (SDCARD, SSD), such as the storage device 410. The volatile media comprise the dynamic memory, such as the main memory 406. Common forms of storage media comprise, for example, a USB key, a SD card, a hard disk, a semiconductor reader, a magnetic tape or any other magnetic data storage medium, a CD-ROM, any other optical data storage medium, any physical medium with hole patterns, a RAM, a PROM, and an EPROM, a FLASH-EPROM, a NVRAM, any other chip or memory cartridge.

The storage media are distinct from the transmission media, but could be sued together with these. The transmission media contribute to the transfer of information between the storage media. For example, the transmission media comprise coaxial cables, copper wires and optical fibres, including the wires that form the bus 402. The transmission media may also be in the form of acoustic or light waves, such as those generated during data communications by radiofrequency or infrared waves. Various forms of media may also be involved in the transport of one or several sequence(s) of one or several instruction(s) towards the processor 404 for execution. For example, the instructions may initially be transported on a magnetic disk or a semiconductor reader of a remote computer. The remote computer may load the instructions in its dynamic memory and transmit the instructions over a telephone line using a modem. A local modem of the computer system 400 may receive the data over the telephone line and use an infrared emitter to convert the data into an infrared signal. An infrared detector may receive the data transported in the infrared signal and a suitable circuit may place the data on the bus 402. The bus 402 transports the data towards the main memory 406, from which the processor 404 recovers and executes the instructions. The instructions received by the main memory 406 may possibly be stored on the storage device 410 before or after execution by the processor 404. The computer system 400 also comprise a communication interface 418 coupled to the bus 402. The communication interface 418 provides a bidirectional data communication coupling to a network link 420 which is connected to a local network 422. For example, the communication interface 418 may be an integrated services digital network (ISDN), a wired modem, a satellite modem or a wireless communication board (WLAN). In another example, the communication interface 418 may be a local network board (LAN) to provide a data communication connection to a compatible local network. Wireless links may also be implemented. In any one of these implementations, the communication interface 418 sends and receives electric, electromagnetic or optical signals which transport digital data streams representing various types of information.

In general, the network link 420 ensures data communication through one or several network(s) towards other data devices. For example, the network link 420 may provide a connection via the local network 422 to a host computer 424 or to a piece of data equipment exploited by an internet service provider (ISP) 426. In turn, the ISP 426 provides data communication services through the worldwide data communication network ("Internet") 428 in packets. Both the local network 422 and the Internet 428 use electric, electromagnetic or optical signals which transport digital data streams. The signals flowing through the different networks and the signals over the network link 420 and though the communication interface 418, which transport the digital data towards and from the computer system 400, are examples of transmission media.

The computer system 400 may transmit messages and receive data, including program code, via the network(s), the network link 420 and the communication interface 418. In the example of the Internet, a server 430 may transmit a code requested for an application program via the Internet 428, the ISP 426, the local network 422 and the communication interface 418.

The received code may be executed by the processor 404 progressively with the reception thereof, and/or stored in the storage device 410, or another non-volatile storage for a subsequent execution.

The invention claimed is:

1. A method for authenticating access via a communication terminal, to a service supplied by a server, the method comprising, subsequently to the transmission by an access application of the communication terminal, to the server, of a connection request to the service:
   receiving a reply, originating from the server, via a secure link, comprising a field for entering a user identifier and a hidden field comprising a variable element;
   extracting the variable element;
   transforming the variable element, using a transformation module and transformation materials obtained upon a subscription before the server, the transforming outputting a transformed element;
   transmitting to the server, the transformed element and an identifier associated to the access; and
   receiving an authentication of the access to the service, originating from the server, taking the transformed element into account.

2. The authentication method, according to claim 1, wherein the authentication originating from the server occurs when the transmission, to the server, of the identifier and of the transformed element, is performed before a first period of time.

3. The authentication method, according to claim 1, wherein the authentication is performed without requiring a knowledge of a password to access to the service.

4. The authentication method, according to claim 1, wherein transforming the variable element comprises:
   determining, by the transformation module, of transformation materials to be applied on the variable element; and
   implementing transformation materials on the variable element, outputting the transformed element.

5. The authentication method, according to claim 4, wherein determining transformation materials to be applied on the variable element comprises searching an encryption key within a database.

6. The authentication method, according to claim 5, wherein implementing the transformation materials on the variable element comprises encrypting the random element using the encryption key.

7. The authentication method, according to claim 1, wherein transforming the variable element is implemented by a transformation module executed on the communication terminal, independently of the access application.

8. An electronic device for authenticating access to a service supplied by a server, the device comprising a module for transmitting, to the server, by an access application of the device, a connection request to the service, and:
- a module for receiving a reply, originating from the server, via a secure link, comprising a field for entering a user identifier and a hidden field comprising a variable element;
- a module for extracting the variable element;
- a module for transforming the variable element, using transformation materials obtained upon a subscription before the server, the module for transforming outputting a transformed element;
- a module for transmitting to the server, the transformed element and an identifier associated to the access; and
- a module for receiving an authentication of the access to the service, originating from the server taking the transformed element into account.

9. The access authentication electronic device, according to claim 8, wherein the module for receiving an authentication of the access is implemented when the transmission of the identifier and of the transformed element, by the authentication electronic device, to the server, is performed before a first period of time.

10. The access authentication electronic device, according to claim 8, wherein the authentication is performed without requiring a knowledge of a password to access to the service.

11. The access authentication electronic device, according to claim 8, wherein the module for transforming the variable element comprises:
- a module for determining, by the transformation module, transformation materials to be applied on the variable element; and
- a module for implementing the transformation materials on the variable element, outputting the transformed element.

12. The access authentication electronic device, according to claim 11, wherein the module for determining transformation materials to be applied on the variable element comprises implementation of a module for searching an encryption key within a database.

13. The access authentication electronic device, according to claim 12, wherein the module for implementing the transformation materials on the variable element comprises implementation of a module for encrypting the random element using the encryption key.

14. A processing circuit comprising a processor and a memory, the memory storing program code instructions of a computer program downloadable from a communication network and/or stored on a computer-readable medium and/or executable by the processor for the execution of a method for authenticating access via a communication terminal, to a service supplied by a server, the method comprising, subsequently to the transmission by an access application of the communication terminal, to the server, of a connection request to the service:
- receiving a reply, originating from the server, via a secure link, comprising a field for entering a user identifier and a hidden field comprising a variable element;
- extracting the variable element;
- transforming the variable element, using a transformation module and transformation materials obtained upon a subscription before the server, the transforming outputting a transformed element;
- transmitting to the server, the transformed element and an identifier associated to the access; and
- receiving an authentication of the access to the service, originating from the server taking the transformed element into account.

15. The computer program according to claim 14, wherein the authentication originating from the server occurs when the transmission, to the server, of the identifier and of the transformed element, is performed before a first period of time.

16. The computer program according to claim 14, wherein the authentication is performed without requiring a knowledge of a password to access to the service.

17. The computer program according to claim 14, wherein transforming the variable element comprises:
- determining, by the transformation module, of transformation materials to be applied on the variable element; and
- implementing the transformation materials on the variable element, outputting the transformed element.

18. The computer program according to claim 17, wherein determining transformation materials to be applied on the variable element comprises searching an encryption key within a database.

19. The computer program according to claim 18, wherein implementing the transformation materials on the variable element comprises encrypting the random element using the encryption key.

20. A non-transitory computer-readable record medium on which code instructions of the computer program according to claim 14 are recorded.

* * * * *